(12) United States Patent
Sogabe et al.

(10) Patent No.: US 11,873,234 B2
(45) Date of Patent: Jan. 16, 2024

(54) POSITIVE ELECTRODE ACTIVE MATERIAL PRECURSOR FOR NON-AQUEOUS ELECTROLYTE SECONDARY BATTERY, AND METHOD OF MANUFACTURING POSITIVE ELECTRODE ACTIVE MATERIAL PRECURSOR FOR NON-AQUEOUS ELECTROLYTE SECONDARY BATTERY

(71) Applicant: SUMITOMO METAL MINING CO., LTD., Tokyo (JP)

(72) Inventors: Kentaro Sogabe, Ehime (JP); Kenji Tashiro, Ehime (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 265 days.

(21) Appl. No.: 16/766,859

(22) PCT Filed: Nov. 27, 2018

(86) PCT No.: PCT/JP2018/043645
§ 371 (c)(1),
(2) Date: May 26, 2020

(87) PCT Pub. No.: WO2019/107374
PCT Pub. Date: Jun. 6, 2019

(65) Prior Publication Data
US 2020/0299148 A1    Sep. 24, 2020

(30) Foreign Application Priority Data

Nov. 28, 2017 (JP) ................................. 2017-228250

(51) Int. Cl.
*C01G 53/00* (2006.01)
*H01M 4/525* (2010.01)
(Continued)

(52) U.S. Cl.
CPC ........... *C01G 53/42* (2013.01); *C01G 53/006* (2013.01); *H01M 4/525* (2013.01);
(Continued)

(58) Field of Classification Search
CPC ..................................................... H01M 4/525
See application file for complete search history.

(56) References Cited

U.S. PATENT DOCUMENTS

2015/0024207 A1\* 1/2015 Kase ...................... H01M 4/525
252/182.1
2015/0364761 A1\* 12/2015 Fukui ................... C01G 53/006
429/223

(Continued)

FOREIGN PATENT DOCUMENTS

EP         2819225       12/2014
JP       2011-057518      3/2011
(Continued)

OTHER PUBLICATIONS

International Search Report dated Feb. 26, 2019 with respect to PCT/JP2018/043645.

*Primary Examiner* — Nathanael T Zemui
(74) *Attorney, Agent, or Firm* — IPUSA, PLLC (57) ABSTRACT

A positive electrode active material precursor for a non-aqueous electrolyte secondary battery, including a nickel composite hydroxide particle, is provided, wherein a cross section of the nickel composite hydroxide particle includes a void, a ratio of an area of the void to the cross section of the nickel composite hydroxide particle is less than or equal to 5.0%, a circular region having a radius of 1.78 μm is set at a position where a ratio of an area of the void to the circular region is maximum, on the cross section of the nickel composite hydroxide particle, and the ratio of the area of the void to the circular region is less than or equal to 20%.

4 Claims, 2 Drawing Sheets

(51) Int. Cl.
H01M 10/0525 (2010.01)
H01M 4/02 (2006.01)

(52) U.S. Cl.
CPC ..... H01M 10/0525 (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2016/0293950 A1* | 10/2016 | Kamata | H01M 4/505 |
| 2017/0305757 A1* | 10/2017 | Oshita | C01G 53/04 |
| 2018/0316006 A1 | 11/2018 | Kaneda et al. | |
| 2018/0316010 A1 | 11/2018 | Nakayama et al. | |
| 2019/0020023 A1 | 1/2019 | Yokoyama et al. | |

FOREIGN PATENT DOCUMENTS

| | | |
|---|---|---|
| JP | 2012-119093 | 6/2012 |
| JP | 2016-138024 | 8/2016 |
| JP | 2017-065975 | 4/2017 |
| JP | 2017-084628 | 5/2017 |
| WO | 2015/008582 | 1/2015 |
| WO | 2015/108163 | 7/2015 |

\* cited by examiner

POSITIVE ELECTRODE ACTIVE MATERIAL PRECURSOR FOR NON-AQUEOUS ELECTROLYTE SECONDARY BATTERY, AND METHOD OF MANUFACTURING POSITIVE ELECTRODE ACTIVE MATERIAL PRECURSOR FOR NON-AQUEOUS ELECTROLYTE SECONDARY BATTERY

TECHNICAL FIELD

The present invention relates to a positive electrode active material precursor for a non-aqueous electrolyte secondary battery and a method of manufacturing the positive electrode active material precursor for the non-aqueous electrolyte secondary battery.

BACKGROUND ART

In recent years, with the spread of mobile electronic devices such as mobile phones and notebook personal computers, the development of compact, lightweight secondary batteries with high energy density, is required. Further, development of high-output secondary batteries as batteries for electric vehicles such as hybrid vehicles, is also required. Lithium-ion secondary batteries have been found to be suitable non-aqueous electrolyte secondary batteries that satisfy these requirements.

A lithium-ion secondary battery is formed of, for example, a negative electrode, a positive electrode, an electrolyte solution, and the like, and as the active material of the negative electrode and the positive electrode, a material by which lithium can be de-inserted and inserted, is used.

With a lithium-ion secondary battery in which a lithium composite oxide, in particular, a lithium-cobalt composite oxide that is relatively easy to synthesize, is used as the positive electrode material, it is possible to obtain a high voltage of up to 4 V, and, therefore, lithium-ion secondary batteries are expected to have high energy density and are increasingly being put to practical use. With respect to batteries using a lithium-cobalt composite oxide, numerous developments have been made to obtain superior initial capacity characteristics and cycle characteristics, and a variety of results have already been achieved.

However, because a lithium-cobalt composite oxide uses an expensive cobalt compound as a raw material, the unit price per volume of a battery using lithium-cobalt composite oxide is significantly higher than that of a nickel hydride battery, and, therefore, application of a battery using a lithium-cobalt composite oxide is considerably limited.

For this reason, with respect to compact secondary batteries for mobile devices and large secondary batteries for electric power storage and electric vehicles, there are high expectations to reduce the cost of the positive electrode material, so that cheaper lithium-ion secondary batteries can be manufactured, and the realization of such lithium-ion secondary batteries will have great industrial significance.

As a new material of an active material for lithium-ion secondary batteries, there is a lithium-nickel composite oxide using nickel, which is less expensive than cobalt. This lithium-nickel composite oxide has a lower electrochemical potential than the lithium-cobalt composite oxide, and, therefore, decomposition due to oxidation of the electrolytic solution is unlikely, and a higher capacity can be expected, and because the lithium-nickel composite oxide exhibits a high battery voltage similar to that of the cobalt system, development of the lithium-nickel composite oxide has been actively carried out.

However, when a lithium-ion secondary battery is fabricated by using, as the positive electrode material, a lithium-nickel composite oxide synthesized purely only by nickel, the lithium-ion secondary battery will have a disadvantage that the cycle characteristics are inferior to those of the cobalt system, and the battery performance is relatively easily impaired by use and storage in a high-temperature environment. For this reason, a lithium-nickel composite oxide in which a portion of the nickel is replaced by cobalt or aluminum, is generally known.

Conventionally, various methods have been proposed for manufacturing a positive electrode active material for a non-aqueous electrolyte secondary battery including a lithium-cobalt composite oxide, a lithium-nickel composite oxide, and the like. For example, there is proposed a method of manufacturing a positive electrode active material for a non-aqueous electrolyte secondary battery, in which a positive electrode active material precursor for a non-aqueous electrolyte secondary battery such as a nickel composite oxide is mixed with a lithium compound, and the resulting mixture is fired.

For example, Patent Document 1 discloses a method of manufacturing a positive electrode active material for a non-aqueous electrolyte secondary battery, characterized by including:

a crystallization process in which an alkaline solution is added to a mixed aqueous solution of Ni salt and M salt to co-precipitate the hydroxide of Ni and M, and the resulting precipitate is filtered, washed with water, and dried, to yield a nickel composite hydroxide: $Ni_xM_{1-x}(OH)_2$;

a firing process in which the resulting nickel composite hydroxide: $Ni_xM_{1-x}(OH)_2$ and a lithium compound are mixed so that the molar ratio: Li/(Ni+M) of Li to the sum of Ni and M is 1.00 to 1.15, and the mixture is then fired at a temperature of greater than or equal to 700° C. and less than or equal to 1000° C. to yield a lithium-nickel composite oxide; and a water-washing process in which the resulting lithium-nickel composite oxide is subjected to a water-washing process.

CITATION LIST

Patent Document

[Patent Document 1]
Japanese Unexamined Patent Application Publication No. 2012-119093

SUMMARY OF INVENTION

Technical Problem

However, in recent years, further improvements in the performance of lithium-ion batteries have been required. Therefore, with respect to a lithium-nickel composite oxide that is a positive electrode active material for a non-aqueous electrolyte secondary battery, it is required to improve the cycle characteristic when used, for example, in a non-aqueous electrolyte secondary battery.

Thus, in view of the above-described problems in the conventional technology, it is an object of an aspect of the present invention to provide a precursor of a positive electrode active material for a non-aqueous electrolyte secondary battery that can improve the cycle characteristic, when used as a non-aqueous electrolyte secondary battery.

Solution to Problem

In order to solve the above problem, according to an embodiment of the present invention, there is provided a positive electrode active material precursor for a non-aqueous electrolyte secondary battery, including:
a nickel composite hydroxide particle, wherein
a cross section of the nickel composite hydroxide particle includes a void,
a ratio of an area of the void to the cross section of the nickel composite hydroxide particle is less than or equal to 5.0%,
a circular region having a radius of 1.78 μm is set at a position where a ratio of an area of the void to the circular region is maximum, on the cross section of the nickel composite hydroxide particle, and
the ratio of the area of the void to the circular region is less than or equal to 20%.

Advantageous Effects of Invention

According to an embodiment of the present invention, it is possible to provide a positive electrode active material precursor for a non-aqueous electrolyte secondary battery that exhibits improved cycle characteristic when it is used in a non-aqueous electrolyte secondary battery.

DESCRIPTION OF EMBODIMENTS

In the following, embodiments of the present invention will be described with reference to the accompanying drawings; however, the present invention is not limited to the following embodiments, and various modifications and substitutions can be made to the following embodiments without departing from the scope of the present invention.

[Positive Electrode Active Material Precursor for Non-Aqueous Electrolyte Secondary Battery]

First, an example of a configuration of a positive electrode active material precursor for a non-aqueous electrolyte secondary battery according to the present embodiment will be described.

The positive electrode active material precursor for a non-aqueous electrolyte secondary battery according to the present embodiment can include nickel composite hydroxide particles. Further, the nickel composite hydroxide particles may include voids in the cross section of each of the particles.

Also, it is preferable that the ratio of the area of the voids to the cross section of the nickel composite hydroxide particle is less than or equal to 5.0%.

Further, when a circular region having a radius of 1.78 μm is set at a position where the ratio of the area of the voids to the circular region is maximum, on the cross section of the nickel composite hydroxide particle, it is preferable that the ratio of the area of the voids to the circular region is less than or equal to 20%.

The inventors of the present invention diligently studied a precursor of a positive electrode active material for a non-aqueous electrolyte secondary battery (hereinafter, also simply referred to as a "positive electrode active material precursor"), which is capable of improving the cycle characteristic in a non-aqueous electrolyte secondary battery.

As a result, the present invention has been completed upon finding that, when a positive electrode active material precursor includes nickel composite hydroxide particles including voids inside the particles and the distribution of the voids satisfy a predetermined requirement, in a non-aqueous electrolyte secondary battery using the positive electrode active material prepared from the positive electrode active material precursor, the cycle characteristic can be improved at the positive electrode.

Hereinafter, the positive electrode active material precursor according to the present embodiment will be specifically described.

The positive electrode active material precursor according to the present embodiment can include nickel composite hydroxide particles. Note that the positive electrode active material precursor according to the present embodiment may consist of nickel composite hydroxide particles.

Each of the nickel composite hydroxide particles included in the positive electrode active material precursor according to the present embodiment can include voids in the cross section of the particle. The voids will be described with reference to FIG. 1.

Figure 1:
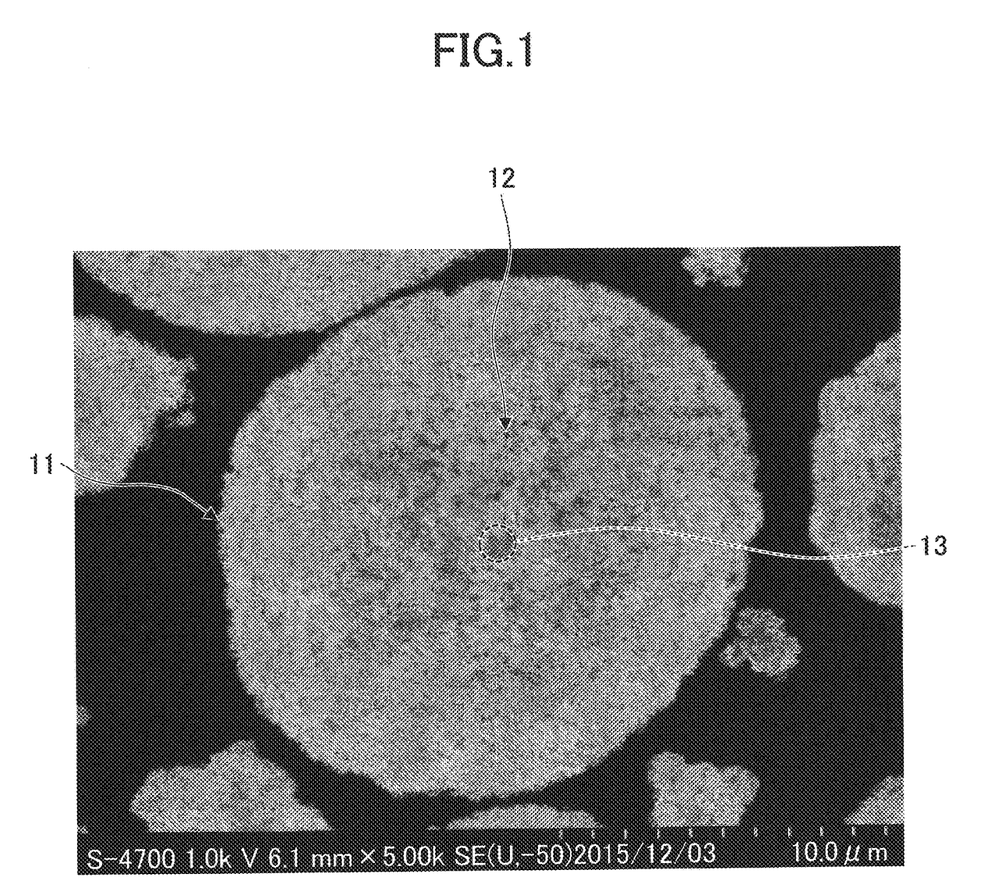
FIG. 1 is a diagram illustrating a circular region in a cross section of a nickel composite hydroxide particle according to an embodiment of the present invention.

As illustrated in FIG. 1, there are voids 12 represented by black dots on the particle cross section of a nickel composite hydroxide particle 11 included in the positive electrode active material precursor according to the present embodiment.

According to the inventors of the present invention, it is preferable that the ratio of the area of the voids to the cross section of the nickel composite hydroxide particle 11 is less than or equal to 5.0%. This is because by reducing the ratio of the area of the voids 12 to the cross section of the nickel composite hydroxide particle 11 to less than or equal to 5.0%, when the nickel composite hydroxide particles 11 react with the lithium compound, the diffusion of the lithium components to the voids 12 can proceed uniformly. As described above, the ratio of the voids 12 for accommodating the lithium compound is reduced, and, therefore, it is possible to prevent the lithium components from becoming unevenly distributed in the cross section of the nickel composite hydroxide particle after reaction with the lithium compound. Therefore, it is possible to reduce the amount of lithium components that do not contribute to the charging and discharging and thereby improve the cycle characteristic. More preferably, the ratio of the area of the voids to the cross section of the nickel composite hydroxide particle is less than or equal to 4.0%.

Note that the lower limit value of the ratio of the area of the voids to the cross section of the nickel composite hydroxide particle is not particularly limited, but may be, for example, greater than 0%. This is because by making the ratio of the area of the voids to the cross section of the nickel composite hydroxide particle to be greater than 0%, the positive electrode active material prepared from the positive electrode active material precursor including the nickel composite hydroxide particles can have lithium components inside the particles, thereby increasing the charging and discharging capacity.

Further, when a circular region 13 having a radius of 1.78 µm is set at the position where the ratio of the area of the voids within the circular region 13 is maximum, on the cross section of the nickel composite hydroxide particle 11, it is preferable that the ratio of the area of the voids within the circular region is less than or equal to 20%.

As illustrated in FIG. 1, the circular region 13 having a radius of 1.78 µm is set at a position where the ratio of the area of the voids 12 within the circular region 13 is maximum.

Also, setting the ratio of the area of the voids within the circular region 13 to be less than or equal to 20%, means that the voids 12 are not unevenly distributed in the cross section of the nickel composite hydroxide particle 11. Therefore, when the positive electrode active material is prepared using the positive electrode active material precursor including the nickel composite hydroxide particles as one of the raw materials, the lithium components can be accommodated by the voids that are distributed in the nickel composite hydroxide particle without being unevenly distributed, so that the lithium components are not unevenly distributed. Therefore, in the non-aqueous electrolyte secondary battery using the positive electrode active material, the amount of the lithium components that do not contribute to the charging and discharging can be reduced, thereby increasing the cycle characteristic.

Note that when the circular region 13 having a radius of 1.78 µm is set at the position where the ratio of the area of the voids to the circular region 13 is maximum, on the cross section of the nickel composite hydroxide particle 11, the lower limit value of the ratio of the area of the voids to the circular region 13 is not particularly limited, for example, but may be greater than 0%.

The particle size of the nickel composite hydroxide particle included in the positive electrode active material precursor according to the present embodiment is not particularly limited; however, for example, the particle size is preferably greater than or equal to 5 µm and less than or equal to 30 µm, and more preferably greater than or equal to 10 µm and less than or equal to 20 µm.

Note that when the positive electrode active material precursor according to the present embodiment includes a plurality of nickel composite hydroxide particles, and when nickel composite hydroxide particles, which have a particle size near the average particle size, specifically, for example, a particle size within ±1 µm of the average particle size, are selected, it is preferable to satisfy the aforementioned ratio of the area of the voids to the particle cross section and the aforementioned ratio of the area of the voids to the circular region.

When the positive electrode active material precursor according to the present embodiment includes a plurality of nickel composite hydroxide particles, it is more preferable to satisfy the aforementioned ratio of the area of the voids to the particle cross section and the aforementioned ratio of the area of the voids to the circular region, with respect to a number of particles corresponding to greater than or equal to 50% to less than or equal to 100% among the number of the plurality of nickel composite hydroxide particles.

The positive electrode active material precursor according to the present embodiment can also include a plurality of nickel composite hydroxide particles having voids on the cross section of the particle as described above. That is, the positive electrode active material precursor according to the present embodiment can also include a nickel composite hydroxide powder. Note that the positive electrode active material precursor according to the present embodiment may consist of a nickel composite hydroxide powder.

Note that when the positive electrode active material precursor according to the present embodiment includes a plurality of nickel composite hydroxide particles, the average particle size of the nickel composite hydroxide particles is not particularly limited; however, for example, the average particle size is preferably greater than or equal to 5 µm and less than or equal to 30 µm, and more preferably greater than or equal to 10 µm and less than or equal to 20 µm.

Here, the average particle size means the particle size at the cumulative value of 50% in the particle size distribution determined by the laser diffraction/scattering method. In the following, the average particle size in the present specification has the same meaning.

The method of calculating the area of the voids in the cross section of the nickel composite hydroxide particle included in the positive electrode active material precursor according to the present embodiment is not particularly limited, but any method can be used for the calculation.

For example, the following procedure can be used to for the evaluation.

The nickel composite hydroxide particle included in the positive electrode active material precursor according to the present embodiment is embedded in resin, and the surface is polished to fabricate a sample having the cross section exposed.

Then, the resulting sample is observed by scanning electron microscopy (SEM). In this case, when the positive electrode active material precursor according to the present embodiment includes a plurality of nickel composite hydroxide particles, it is preferable to select and observe particles having a particle size near the average particle size, specifically, for example, particles having a particle size in the range of greater than or equal to 5 µm and less than or equal to 30 µm, to calculate the area of the voids, etc. In particular, it is more preferable to select and observe particles having a particle size of greater than or equal to 10 µm and less than or equal to 20 µm, to calculate the area of the voids, etc. Specifically, for example, it is preferable to select and observe particles having a particle size that is within ±1 µm of the average particle size, to calculate the area of the voids, etc. The reason why it is preferable that particles having a particle size that is within ±1 µm of the average particle size are selected and evaluated is that, even when other particles are selected and evaluated by a similar method, there is a high probability that the other particles will have voids of the same characteristics, and for example, according to studies by the inventors of the present invention, it was confirmed that the same characteristics are present in a number of particles corresponding to greater than or equal to 50% of the number of the nickel composite hydroxide particles. Note that the particles usually have indeterminate shapes, and, therefore, the particles to be evaluated can be selected by using the average value of the long side and the short side in the cross section as the particle size.

Next, the area of the voids in the cross section of the particle is calculated from the SEM image. The void is a recess, and, therefore, in a typical SEM image, the void portions are black and the other portions are white. For this reason, the specific method for calculating the area of the voids is not particularly limited; however, for example, a binarization process may be performed on the SEM image, and based on the obtained image, it is possible to calculate the area of black portions corresponding to the void portions and the area of white portions that is the area of other portions.

The binarization process requires a threshold for dividing a plurality of shading values into two values, and general methods for determining a threshold include a p-tile method, a mode method, a discriminant analysis method, and the like. In recent years, a large number of software for performing binarization processes on images has been provided, thereby enabling relatively easy binarization processes of images, including methods for determining thresholds. For example, when using the software "ImageJ", which is free-of-charge (free software), the threshold is determined by discriminant analysis and the SEM image can easily be binarized.

Note that with respect to the circular region, when calculating the area of the voids and the area other than the voids in the circular region as described above, for example, the cross-sectional SEM image of the particle to be evaluated can be binarized as described above, and the circular region may be set at a position where the ratio of the area of the voids to the circular region is maximum, and the area of the voids and the area other than the voids can be calculated in the same manner for the circular area.

The composition of the nickel composite hydroxide particle included in the positive electrode active material precursor according to the present embodiment is not particularly limited as long as the nickel composite hydroxide particles can be mixed with a lithium compound to form a lithium-nickel composite oxide.

However, a lithium-nickel-cobalt composite oxide is useful as a positive electrode active material for a non-aqueous electrolyte secondary battery, and, therefore, a positive electrode active material precursor for manufacturing the lithium-nickel-cobalt composite oxide is required. For this reason, it is preferable that the nickel composite hydroxide particles are particles of a nickel composite hydroxide including nickel and cobalt.

Further, it is reviewed to enhance the battery characteristics by adding elements in addition to lithium, nickel, and cobalt to the lithium-nickel-cobalt composite oxide.

For this reason, it is preferable that the nickel composite hydroxide particles are particles of a nickel composite hydroxide including an element M (M is one or more kinds of elements selected from Mg, Al, Ca, Ti, V, Cr, Mn, Zr, Nb, Mo, Sr, and W) as an additive element.

Specifically, the nickel composite hydroxide particles of the positive electrode active material precursor according to the present embodiment can be, for example, particles of a nickel composite hydroxide represented by a general formula: $Ni_{1-x-y}Co_xM_y(OH)_{2+A}$. Note that in the above-described general formula, $0 \le x \le 0.35$, $0 \le y \le 0.35$, and $0 \le A \le 0.5$ may be set. The element M may be one or more kinds of elements selected from Mg, Al, Ca, Ti, V, Cr, Mn, Zr, Nb, Mo, Sr, and W.

The positive electrode active material precursor according to the present embodiment includes nickel composite hydroxide particles as described above, and can be mixed with a lithium compound to be used in the manufacturing of a positive electrode active material. Further, the positive electrode active material precursor according to the present embodiment can be roasted so that some of or all of the nickel composite hydroxide particles become nickel composite oxide particles, and the nickel composite oxide particles can be mixed with a lithium compound to be used for manufacturing the positive electrode active material.

According to studies by the inventors of the present invention, also when the positive electrode active material precursor according to the present embodiment is roasted, in a non-aqueous electrolyte secondary battery using the positive electrode active material prepared from the positive electrode active material precursor after being roasted, the cycle characteristic can be improved.

It is probable that the above effects can be achieved because, even when the nickel composite oxide particles are used, the voids can be distributed without being unevenly distributed, in the cross section of each of the particles, similar to the case of the nickel composite hydroxide particles.

[Method of Manufacturing Positive Electrode Active Material Precursor]

The method of manufacturing the positive electrode active material precursor according to the present embodiment is not particularly limited, and the positive electrode active material precursor can be manufactured by any method as long as the included nickel composite hydroxide particles have the above described voids.

Hereinafter, an example of a configuration of a method of manufacturing a positive electrode active material precursor according to the present embodiment will be described.

The method of manufacturing the positive electrode active material precursor according to the present embodiment can include a crystallization process of crystallizing a positive electrode active material precursor including nickel composite hydroxide particles in a reaction solution including at least a mixed aqueous solution of metal salts including nickel salt, an ammonium ion supplier, and an alkaline material.

The crystallization process can be performed in an atmosphere in which the oxygen concentration is less than or equal to 20%. Further, the reaction solution preferably has an ammonium ion concentration of greater than or equal to 5.0 g/L and a pH value of greater than or equal to 11.0 based on the liquid temperature of 50° C.

An example of the configuration of the crystallization process will be described below.

In the crystallization process, it is possible to obtain the positive electrode active material precursor by, while stirring a reaction solution, supplying, to the reaction solution, a mixed aqueous solution including a metal salt (a) (hereinafter, also simply referred to as "mixed aqueous solution (a)") and an ammonium ion supplier (b) for forming the positive electrode active material precursor, and also supplying, to the reaction solution, an alkaline material (c) so as to react with the aforementioned solutions, thereby causing solid-liquid separation, washing with water, and drying with respect to the particles of the crystallized positive electrode active material precursor.

Note that when starting the crystallization process, an initial aqueous solution, which is a mixture of water, the ammonium ion supplier (b), and the alkaline material (c), can be prepared in the reaction tank. The initial aqueous solution is preferably prepared by adding, to the initial aqueous solution, the ammonium ion supplier (b) and the alkaline material (c), and adjusting the temperature, so that the ammonium ion concentration, the pH value, and the temperature of the initial aqueous solution are within the preferred range for the reaction solution, as described below. Then, after the crystallization process starts, the mixed aqueous solution (a), the ammonium ion supplier (b), and the alkaline material (c) are added to the initial aqueous solution as described above, and the reaction solution is formed.

The mixed aqueous solution (a) is a supply source of metal that forms the positive electrode active material precursor, and can include at least a nickel salt. Further, for example, if the positive electrode active material precursor includes nickel and cobalt, the mixed aqueous solution (a) can include a nickel salt and a cobalt salt. An additional metal salt of the element M may also be included, as described above.

The ammonium ion supplier (b) serves as a complexing agent to control the particle size and shape of the particles of the positive electrode active material precursor to be generated. Moreover, the ammonium ion is not incorporated into the particles of the positive electrode active material precursor to be generated, and is therefore a preferable complexing agent for obtaining particles of the positive electrode active material precursor having high purity. The ammonium ion supplier (b) is preferably added in the state of an aqueous solution.

The alkaline material (c) is a pH adjusting agent for neutralization reactions.

The concentration of the metal salt of the metal forming the positive electrode active material precursor in the mixed aqueous solution (a), is not particularly limited, but is preferably greater than or equal to 0.5 mol/L and less than or equal to 2.4 mol/L. By setting the concentration to greater than or equal to 0.5 mol/L, the volume of liquid in each process can be reduced and the productivity can be increased. Further, by setting the concentration to less than or equal to 2.4 mol/L, for example, even when the temperature decreases, the recrystallization of the metal salt in the mixed aqueous solution (a) can be prevented.

In the crystallization process, in order to obtain nickel composite hydroxide particles with voids having a predetermined distribution, the pH of the reaction solution is preferably maintained at greater than or equal to 11.0 on the basis of 50° C. By setting the pH of the reaction solution to greater than or equal to 11.0, the initial nucleation in the reaction system can be promoted and particle growth can be promoted on the basis of the nucleus. Accordingly, it is possible to obtain particles of a positive electrode active material precursor that have grown to a sufficient size.

Note that the upper limit value of the pH of the reaction solution in the crystallization process is not particularly limited; however, on the basis of 50° C., the pH of the reaction solution is preferably maintained at less than or equal to 13.0, more preferably maintained at less than or equal to 12.5, and even more preferably maintained at less than or equal to 12.0.

This is because, during the crystallization process, the particle size of the resulting nickel composite hydroxide particles can be sufficiently increased by setting the pH of the reaction solution to less than or equal to 13.0 on the basis of 50° C. As described above, by sufficiently increasing the particle size of the nickel composite hydroxide particles, the battery characteristics of the battery using the positive electrode active material manufactured from the positive electrode active material precursor including the nickel composite hydroxide particles can be particularly enhanced.

During the crystallization process, the temperature of the reaction solution is preferably maintained at greater than or equal to 20° C. and less than or equal to 70° C., and more preferably maintained at greater than or equal to 40° C. and less than or equal to 70° C. By setting the temperature of the reaction solution to greater than or equal to 20° C., the generation of fine particles can be prevented. Further, it is possible to control the temperature without using a chiller and the like, thereby reducing the cost of equipment. Further, when the temperature is set to less than or equal to 70° C., it is possible to prevent the volatilization of ammonia and control the concentration of ammonium ions in the reaction system, particularly easily.

Further, during the crystallization process, the concentration of the ammonium ion in the reaction solution is preferably maintained at greater than or equal to 5.0 g/L, and more preferably maintained at greater than or equal to 13.0 g/L.

By setting the ammonium ion concentration to greater than or equal to 5.0 g/L, the generation of fine particles can be prevented regardless of the solubility and the like of the metal forming the positive electrode active material, and the particle size of the resulting positive electrode active material precursor can be particularly increased. Further, when the particles are grown, it is possible to supply the salt of the metal that forms the positive electrode active material precursor to the inside of the particles, and nickel composite hydroxide particles having a high density can be obtained. Therefore, the density of the positive electrode active material prepared from the positive electrode active material precursor can be increased, and the energy density per volume can be increased.

Note that the upper limit value of the ammonium ion concentration in the reaction solution is not particularly limited, but during the crystallization process, the concentration is preferably maintained at less than or equal to 30.0 g/L, more preferably maintained at less than or equal to 20.0 g/L, and even more preferably maintained at less than or equal to 18.0 g/L.

By setting the ammonium ion concentration to less than or equal to 30.0 g/L, it is possible to prevent the increase in the ammonia concentration in the atmosphere around the reaction tank during the manufacturing process, and it is possible to prevent the occurrence of problems such as odor. Further, by setting the ammonium ion concentration to less than or equal to 30.0 g/L, the concentration of the metal components forming the positive electrode active material precursor in the reaction solution can be particularly uniform, and it is possible to particularly prevent the deviation of the composition in the positive electrode active material precursor, and is thus preferable.

The metal salt of the metal forming the positive electrode active material precursor used in the mixed aqueous solution (a) is preferably at least one of a sulfate, a nitrate, and a chloride, and more preferably, a sulfate that is not contaminated with halogen. For example, cobalt sulfate, nickel sulfate, and the like can be used.

Further, as described above, to the positive electrode active material precursor, it is possible to add one or more kinds of elements selected from Mg, Al, Ca, Ti, V, Cr, Mn, Zr, Nb, Mo, Sr, and W, as the element M. When adding the element M, a compound of the element M may be added to the mixed aqueous solution (a). Examples of the compound of the element M include, but are not limited to, magnesium sulfate, calcium nitrate, strontium nitrate, titanium sulfate, ammonium molybdate, sodium tungstate, ammonium tungstate, and the like. Here, examples of a compound of the element M are given; however, the compound of the element M is not limited to the above-described examples, and a variety of compounds may be used, including sulfate, nitrate, chloride, and the like including the desired the element M.

Even when the compound of the element M is added to the mixed aqueous solution (a), the concentration of the metal salt in the mixed aqueous solution (a) is preferably maintained under the conditions described above. Further, the addition amount of the element M is adjusted so that the ratio of the number of atoms of metal ions present in the mixed aqueous solution (a) matches the ratio of the number of atoms of the metal element in the desired positive electrode active material precursor.

Note that the element M does not necessarily have to be added to the mixed aqueous solution (a) to co-precipitate. For example, the mixed aqueous solution (a) may be co-precipitated without adding the element M, and on the surface of the resulting co-precipitate, a compound such as a hydroxide or an oxide of the element M may be precipitated by a wet neutralization method. Further, when a plurality of types of the element M are added, the desired positive electrode active material precursor may be obtained by combining the above-described addition methods.

Further, when preparing the mixed aqueous solution (a), it is preferable that the metal salt be adjusted so that the ratio of the number of atoms of the metal ions present in the mixed aqueous solution matches the ratio of the number of atoms of the metal elements in the desired positive electrode active material precursor.

The ammonium ion supplier (b) is not particularly limited, but is preferably in the state of an aqueous solution as described above. The ammonium ion supplier (b) is preferably, for example, aqueous ammonia, an aqueous solution of ammonium sulfate or ammonium chloride, and more preferably an aqueous ammonia that is not contaminated with halogen and an aqueous solution of ammonium sulfate. Further, the concentration of the ammonium ion supplier is not particularly limited, and it is sufficient to adjust the concentration so that the concentration of the ammonium ion can be maintained in each process.

The alkaline material (c) is also preferably in the state of an aqueous solution in terms of the ease of controlling the pH value. The alkaline material (c) is not particularly limited, and for example, an aqueous solution of an alkali metal hydroxide such as sodium hydroxide or potassium hydroxide may be used.

The method of the crystallization process is not particularly limited, but it is preferable that the mixed aqueous solution (a) and the ammonium ion supplier (b) are supplied quantitatively continuously, and the alkaline material (c) is supplied by adjusting the amount of addition, so that reaction is performed by maintaining the reaction solution at a predetermined pH, and the reaction solution including the precursor particles is continuously overflowed from the reaction tank, thereby collecting the positive electrode active material precursor.

Further, it is preferable that the crystallization process is performed in a non-oxidizing atmosphere having an oxygen concentration (oxygen content) of less than or equal to 20 volume %, and more preferably in a non-oxidizing atmosphere having an oxygen concentration of less than or equal to 15 volume %. The ratio of the voids in the nickel composite hydroxide particle can be reduced by performing the crystallization process under such a non-oxidizing atmosphere, and is thus preferable. Note that oxygen is does not have to be included, and, therefore, the oxygen content in the atmosphere when the crystallization process is performed may be, for example, greater than or equal to 0 volume %.

Specifically, for example, the crystallization process is preferably performed under an inert gas atmosphere, and can be performed under an atmosphere of one or more types of gas selected from, for example, nitrogen, helium, argon, and the like.

Preferably, the reaction tank used in the crystallization process is a container including, but not limited to, a stirrer, an overflow spout, and a temperature control means. Further, it is preferable to use a container with a high sealing property so that the interior of the reaction tank can be controlled to a predetermined atmosphere.

After the crystallization process, the resulting positive electrode active material precursor can be directly used as a raw material for the positive electrode active material.

Further, the positive electrode active material precursor may be roasted so that some or all of the included nickel composite hydroxide particles turn into nickel composite oxide particles, and used as the raw material of the positive electrode active material. As described above, when the positive electrode active material precursor is to be roasted, after the crystallization process of the method of manufacturing the positive electrode active material precursor according to the present embodiment, a roasting process in which the positive electrode active material precursor obtained by the crystallization process is roasted can be further carried out.

The conditions when roasting the positive electrode active material precursor obtained in the crystallization process are not particularly limited, and the roasting conditions can be selected according to the degree of conversion to the required oxide and the like.

In the roasting process, for example, the positive electrode active material precursor obtained by the crystallization process can be roasted at a temperature of greater than or equal to 500° C. and less than or equal to 700° C.

In the roasting process, the atmosphere in which the positive electrode active material precursor is roasted is not particularly limited as long as the atmosphere is a non-reducing atmosphere; however, the atmosphere is preferably an air flow in which the roasting can be easily performed.

The equipment used for roasting is not particularly limited as long as the positive electrode active material precursor can be heated in a non-reducing atmosphere, preferably in an air flow, and an electric furnace without gas generation is preferably used.

Note that the roasting process may be performed, for example, before the mixing process, in the manufacturing method of the positive electrode active material to be described below.

[Method of Manufacturing Positive Electrode Active Material]

The method of manufacturing the positive electrode active material according to the present embodiment is not particularly limited. The method of manufacturing the positive electrode active material according to the present embodiment can include, for example, the following processes.

A mixing process of preparing a mixture of the aforementioned positive electrode active material precursor and a lithium compound.

A firing process of firing the above-described mixture.

Each process will be described below.

(Mixing Process)

In the mixing process, a positive electrode active material precursor and a lithium compound are mixed to obtain a mixture (powder mixture).

The ratio when mixing the positive electrode active material precursor and the lithium compound is not particularly limited and may be selected depending on the composition of the positive electrode active material to be manufactured.

Li/Me hardly varies before and after the firing process described below, and, therefore, Li/Me in the mixture subjected to the firing process is almost the same as Li/Me in the resulting positive electrode active material. Therefore, it is preferable to mix the components of the mixture such that the Li/Me in the mixture prepared in the mixing process is the same as the Li/Me in the desired positive electrode active material.

For example, in the mixing process, it is preferable to mix the components such that the ratio (Li/Me) of the number of atoms of a metal (Me) other than lithium to the number atoms of lithium (Li) in the mixture is greater than or equal to 1.00 and less than or equal to 1.08. In particular, it is more preferable to mix the components such that the ratio (Li/Me) of the number of atoms of a metal other than lithium to the number atoms of lithium in the mixture is greater than or equal to 1.025 and less than or equal to 1.045.

The lithium compound to be subjected to the mixing process is not particularly limited, but for example, one or more kinds of elements selected from lithium hydroxide, lithium carbonate, and the like, may be preferably used.

As the mixing method for mixing the positive electrode active material precursor and the lithium compound in the mixing process, a general mixing machine may be used. For example, a shaker mixer, a Loedige mixer, a Julia mixer, a V-blender, and the like may be used.

Note that as described above, the roasting process may be performed in advance, and the mixing process may include preparing a mixture of a positive electrode active material precursor in which some or all of the nickel composite hydroxide particles are turned into nickel composite oxide particles, and a lithium compound.

(Firing Process)

In the firing process, the mixture obtained in the above-described mixing process is fired to form the positive electrode active material. When the mixture is fired in the firing process, the lithium in the lithium compound diffuses into the positive electrode active material precursor, to form the positive electrode active material.

In the firing process, although the firing temperature for firing the mixture is not particularly limited, for example, the firing temperature is preferably greater than or equal to 600° C. and less than or equal to 950° C., and more preferably greater than or equal to 700° C. and less than or equal to 900° C.

By setting the firing temperature to greater than or equal to 600° C., the diffusion of lithium into the positive electrode active material precursor can sufficiently proceed, and the crystal structure of the resulting positive electrode active material can be made uniform. For this reason, when this generated product is used as the positive electrode active material, the battery characteristics can be particularly enhanced, and is therefore preferable. Also, the reaction can proceed sufficiently, and, therefore, excess lithium residues and residual unreacted particles can be reduced.

By setting the firing temperature to less than or equal to 950° C., it is possible to prevent the progress of sintering between the particles of the positive electrode active material to be generated. Further, it is possible to prevent abnormal particle growth and prevent the coarseness of particles of the resulting positive electrode active material.

Further, in the process of raising the temperature to the firing temperature, the mixture can be maintained at a temperature near the melting point of the lithium compound for greater than or equal to 1 hour and less than or equal to 5 hours, and in this case, the reaction can be performed more uniformly, and is therefore preferable.

In the firing time in the firing process, the time of maintaining a predetermined temperature, that is, the above-described firing temperature, is not particularly limited, but is preferably greater than or equal to 2 hours, and more preferably greater than or equal to 4 hours. This is because by setting the time of maintaining the firing temperature to greater than or equal to 2 hours, it is possible to sufficiently promote the generation of the positive electrode active material and to more reliably prevent the residue of the unreacted materials.

The upper limit of the time of maintaining the firing temperature is not particularly limited, but it is preferable that the time of maintaining the firing temperature is less than or equal to 24 hours in consideration of productivity and the like.

The atmosphere during firing is not particularly limited, but it is preferable to use an oxidizing atmosphere. As the oxidizing atmosphere, an oxygen-including gas atmosphere may be preferably used, and for example, it is more preferable that the atmosphere has an oxygen concentration of greater than or equal to 18 volume % and less than or equal to 100 volume %.

This is because by setting the oxygen concentration in the atmosphere to greater than or equal to 18 volume % during firing, the crystallinity of the positive electrode active material can be particularly enhanced.

When the atmosphere is an oxygen-including gas atmosphere, the atmosphere may be composed of gas, for example, air, oxygen, or a mixture of oxygen and an inert gas may be used.

Note that, for example, when a gas mixture of oxygen and an inert gas is used as the gas forming the oxygen-including gas atmosphere as described above, it is preferable that the oxygen concentration in the gas mixture satisfies the above-described range.

In particular, the firing process is preferably performed in an oxygen-including gas flow, and more preferably performed in an atmosphere or in an oxygen flow. Particularly, in consideration of battery characteristics, it is preferable to perform the firing process in an oxygen flow.

Note that the furnace used for firing is not particularly limited, as long as the furnace is capable of firing the mixture in an oxygen-including gas atmosphere. However, from the viewpoint of maintaining a uniform atmosphere inside the furnace, an electric furnace with no gas generation is preferable, and a batch-type furnace or a continuous-type furnace may be used.

The positive electrode active material obtained by the firing process may be aggregated or mildly sintered. In this case, the positive electrode active material may be crushed.

Here, crushed means an operation in which an aggregate, which is formed of a plurality of secondary particles produced by sintering necking between secondary particles during firing, is subjected to mechanical energy, to separate the secondary particles with little destruction of the secondary particles themselves, so that the aggregate is loosened.

Further, it is preferable that a calcination process is performed before the firing process.

When the calcination is performed, the temperature of the calcination is not particularly limited, but may be lower than the firing temperature in the firing process. For example, the calcination temperature is preferably greater than or equal to 250° C. and less than or equal to 600° C., and more preferably greater than or equal to 350° C. and less than or equal to 550° C.

The calcination time, that is, the time of maintaining the aforementioned calcination temperature, is preferably, for example, greater than or equal to 1 hour and less than or equal to 10 hours, and more preferably greater than or equal to 3 hours and less than or equal to 6 hours.

After the calcination, the mixture can be cooled and then subjected to the firing process. However, the temperature can be increased from the calcination temperature to the firing temperature to perform the firing process continuously after the calcination.

Note that the atmosphere in which the calcination is performed is not particularly limited, but for example, the atmosphere may be the same as that in the firing process.

By performing the calcination, lithium diffusion to the positive electrode active material precursor sufficiently proceeds, and it is possible to obtain a particularly uniform positive electrode active material.

The method of manufacturing the positive electrode active material according to the present embodiment may further include any process.

For example, a water-washing process can be performed to remove excess lithium compounds adhering to the surface of the resulting positive electrode active material.

In the water-washing process, for example, the positive electrode active material obtained in the firing process can be poured into pure water to form a slurry, and after stirring for a predetermined period of time, the positive electrode active material can be separated from water, filtered, and dried.

According to the method of manufacturing the positive electrode active material according to the present embodiment, the aforementioned positive electrode active material precursor is used, and, therefore, in the manufactured positive electrode active material, it is possible to prevent the lithium components from being unevenly distributed in the nickel composite hydroxide particles or the nickel composite oxide particles included in the positive electrode active material precursor. Therefore, it is possible to reduce the amount of lithium components that do not contribute to the charging and discharging and thereby improve the cycle characteristic, in the positive electrode active material manufactured by the method of manufacturing the positive electrode active material according to the present embodiment.

[Non-Aqueous Electrolyte Secondary Battery]

Next, a configuration example of a non-aqueous electrolyte secondary battery according to the present embodiment will be described.

The non-aqueous electrolyte secondary battery according to the present embodiment can have a positive electrode formed from the aforementioned positive electrode active material as the positive electrode material.

First, an example of a structure of the non-aqueous electrolyte secondary battery according to the present embodiment will be described.

The non-aqueous electrolyte secondary battery according to the present embodiment can have a structure that is substantially similar to that of a general non-aqueous electrolyte secondary battery, except that the aforementioned positive electrode active material is used as the positive electrode material.

Specifically, the non-aqueous electrolyte secondary battery according to the present embodiment can have a structure including, for example, a case and a positive electrode, a negative electrode, an electrolyte solution, and a separator included within the case.

More specifically, the positive electrode and the negative electrode can be laminated via the separator to form an electrode body, and the resulting electrode body can be impregnated with an electrolyte solution. Then, it is possible to form a structure in which the portion between a positive electrode current collector at the positive electrode and a positive electrode terminal that leads to the outside, and the portion between a negative electrode current collector at the negative electrode and a negative electrode terminal that leads to the outside, are connected to each other using a lead for current collection and the like, and these elements are sealed in the case.

Note that the structure of the non-aqueous electrolyte secondary battery according to the present embodiment is not limited to the above-described example, and the external shape of the non-aqueous electrolyte secondary battery may be of various shapes, such as cylindrical and laminated shapes.

An example of the configuration of each part will be described below.

(Positive Electrode)

First, the positive electrode is described.

The positive electrode is a sheet-like part, and can be formed, for example, by applying and drying a positive electrode mixture paste including the previously described positive electrode active material on the surface of a current collector made of aluminum foil. Note that the positive electrode is appropriately processed in accordance with the battery to be used. For example, a cutting process may be performed in which a suitable size is formed depending on the desired battery, or a compression process may be performed by a roll press and the like in order to increase the electrode density.

The above-described positive electrode mixture paste can be formed by adding a solvent to the positive electrode mixture material and kneading the material. The positive electrode mixture material can be formed by mixing the aforementioned positive electrode active material in a powder form, a conductive material, and a binding agent.

The conductive material is added to provide suitable conductivity to the electrode. Although the material of the conductive material is not particularly limited, for example, graphite such as natural graphite, artificial graphite, and expanded graphite, or a carbon black-based material such as acetylene black and Ketjen black (registered trademark) may be used.

The binding agent serves as a binder of the positive electrode active material. The binding agent used for the positive electrode mixture material is not particularly limited, but one or more kinds of materials selected from, for example, polyvinylidene fluoride (PVDF), polytetrafluoroethylene (PTFE), fluorine rubber, ethylene propylene diene rubber, styrene butadiene, cellulosic resin, polyacrylic acid, and the like can be used.

Note that activated carbon and the like may be added to the positive electrode mixture material. By adding activated carbon and the like to the positive electrode mixture material, the electric double layer capacity of the positive electrode can be increased.

The solvent functions to dissolve the binding agent and disperse the positive electrode active material, the conductive material, the activated carbon, and the like in the binding agent. The solvent is not particularly limited, but an organic solvent such as, for example, N-methyl-2-pyrrolidone may be used.

Further, the mixing ratio of each substance in the positive electrode mixture paste is not particularly limited, and may be the same as in the case of, for example, the positive electrode of a general non-aqueous electrolyte secondary battery. For example, when the solid content of the positive electrode mixture material excluding solvent is 100 parts by mass, the content of the positive electrode active material can be greater than or equal to 60 parts by mass and less than or equal to 95 parts by mass, the content of the conductive material can be greater than or equal to 1 part by mass and less than or equal to 20 parts by mass, and the content of the binding agent can be greater than or equal to 1 part by mass and less than or equal to 20 parts by mass.

Note that the method of manufacturing the positive electrode is not limited to the above-described method. For example, the positive electrode mixture material or the positive electrode mixture paste may be subjected to press-molding, and then dried in a vacuum atmosphere, etc., to manufacture the positive electrode.

(Negative Electrode)

The negative electrode is a sheet-like part formed by applying the negative electrode mixture paste to the surface of a metal foil current collector, such as copper, and drying the negative electrode mixture paste.

The negative electrode is formed by substantially the same method as that of the above-described positive electrode, although the components forming the negative electrode mixture paste, the composition thereof, and the material of the current collector are different, and various processes are performed as necessary in the same manner as for the positive electrode.

The negative electrode mixture paste can be made into a paste by adding a suitable solvent to the negative electrode mixture material which is a mixture of the negative electrode active material and the binding agent.

As the negative electrode active material, for example, a material including lithium, such as metallic lithium or a lithium alloy, or an occluding material capable of occluding and de-inserting lithium-ions can be used.

The occluding material is not particularly limited, but one or more kinds of materials selected from, for example, an organic compound fired body such as natural graphite, artificial graphite, phenolic resin and the like, and carbon material powder such as coke can be used.

When such an occluding material is used in the negative electrode active material, a fluorine-including resin such as PVDF may be used as the binding agent, and as the solvent for dispersing the negative electrode active material in the binding agent, an organic solvent such as N-methyl-2-pyrrolidone may be used, similar to the positive electrode.

(Separator)

The separator is arranged between the positive electrode and the negative electrode, and separates the positive electrode and the negative electrode, and functions to retain the electrolyte solution.

As the material of the separator, for example, a thin film, such as polyethylene or polypropylene, having a large number of fine pores may be used. However, as long as the separator has the above-described function, the separator is not particularly limited.

(Electrolyte Solution)

The electrolyte solution is formed by dissolving lithium salt as a supporting salt in an organic solvent.

The organic solvent may be one type of compound or a mixture of two or more kinds of compounds selected from a cyclic carbonate, such as ethylene carbonate, propylene carbonate, butylene carbonate, or trifluoropropylene carbonate; a chain carbonate, such as diethyl carbonate, dimethyl carbonate, ethyl methyl carbonate, or dipropyl carbonate; an ether compound, such as tetrahydrofuran, 2-methyl tetrahydrofuran, or dimethoxyethane; a sulfur compound, such as ethyl methyl sulfone or butane sulfone; or a phosphorus compound, such as triethyl phosphate or trioctyl phosphate.

The supporting salt may be $LiPF_6$, $LiBF_4$, $LiClO_4$, $LiAsF_6$, $LiN(CF_3SO_2)_2$, or a composite salt thereof.

Note that the electrolyte solution may include a radical scavenger, a surfactant, a flame retardant, and the like, to improve the battery characteristics.

In the above, the non-aqueous electrolyte secondary battery according to the present embodiment has been described as an example of a form in which an electrolyte solution (a non-aqueous electrolyte solution) is used as the electrolyte. However, the non-aqueous electrolyte secondary battery according to the present embodiment is not limited to such a form. For example, a solid electrolyte may be used as the electrolyte (non-aqueous electrolyte). A solid electrolyte has a characteristic of withstanding a high voltage. Examples of the solid electrolyte include inorganic solid electrolyte and organic solid electrolyte.

Examples of the inorganic solid electrolyte include an oxide-based solid electrolyte and a sulfide-based solid electrolyte.

The oxide-based solid electrolyte is not particularly limited. For example, a material including oxygen (O) and having a lithium-ion conductivity and an electron insulating property may be suitably used. Examples of oxide-based solid electrolyte include one or more kinds of components selected from lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ ($0 \leq X \leq 1$), $Li_{1+x}Al_xGe_{2-x}(PO_4)_3$ ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, a material including sulfur (S) and having a lithium-ion conductivity and an electron insulating property may be suitably used. Examples of sulfide-based solid electrolyte include one or more kinds of components selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and the like.

Note that as the inorganic solid electrolyte, a material other than the above may be used; for example, $Li_3N$, $LiI$, $Li_3N$—$LiI$—$LiOH$, and the like may be used.

The organic solid electrolyte is not particularly limited as long as the material is a polymer compound exhibiting ionic conductivity. For example, polyethylene oxide, polypropylene oxide, copolymers thereof, and the like may be used. Further, the organic solid electrolyte may also include a supporting salt (lithium salt).

As described above, when using a non-aqueous electrolyte secondary battery using a solid electrolyte as the electrolyte, that is, when the battery is used as an all-solid battery, the configurations other than the positive electrode active material can be changed from the aforementioned configuration as necessary.

EXAMPLES

Hereinafter, the present invention will be described in more detail with reference to examples. However, the present invention is not limited to the following examples.

Example 1

(Manufacture of Positive Electrode Active Material Precursor)

The crystallization process was performed according to the following procedure to manufacture $Ni_{0.88}Co_{0.12}(OH)_2$ as the positive electrode active material precursor.

A crystallizing device equipped with a reaction tank (a stirring tank) with a cylindrical shape inside, was prepared.

In the reaction tank, an impeller is provided so that the initial aqueous solution or reaction solution in the reaction tank can be stirred by the impeller. Further, the reaction tank is provided with an overflow spout and is configured to collect the positive electrode active material precursor generated by continuous overflow.

Then, pure water was put into the reaction tank, and the temperature in the reaction tank was set to 49° C. The initial aqueous solution and reaction solution were maintained at 49° C. until the crystallization process was completed.

Then, 25 mass % of aqueous ammonia was added to the water in the reaction tank as the ammonium ion supplier (b) so that the ammonium ion concentration of the initial aqueous solution was 17.0 g/L.

Further, as the alkaline material (c), 24 mass % of a sodium hydroxide aqueous solution was added to the water in the reaction tank, and the pH was adjusted to 11.5, and was used as the initial aqueous solution.

Then, while stirring the initial aqueous solution with an impeller, the mixed aqueous solution (a) including nickel salt and cobalt salt, the ammonium ion supplier (b), and the alkaline material (c) were continuously supplied in the initial aqueous solution to form a reaction solution, and crystallization of the positive electrode active material was performed.

The mixed aqueous solution (a) including nickel salt and cobalt salt used includes nickel sulfate as nickel salt and cobalt sulfate as cobalt salt. Each metal salt was added and mixed so that the amount of substance ratio of the material amount of nickel and cobalt in the mixed aqueous solution (a) was 88:12 and the concentration of the metal salt was 2.1 mol/L.

As the ammonium ion supplier (b) and alkaline material (c), the same aqueous solutions used in preparing the initial aqueous solution were used.

During the crystallization process, it was confirmed that the reaction solution maintained a liquid temperature of 49° C., a pH of 11.5 on the basis of 50° C., and an ammonium ion concentration of 17.0 g/L.

Further, during the crystallization process, the oxygen concentration was 5.0 volume % in the reaction tank, and as the remaining part, gas that is nitrogen was continuously supplied, and the atmosphere of the gas was maintained in the reaction tank.

The collected crystallized material was washed with water, filtered, and dried to obtain nickel composite hydroxide particles, which were the positive electrode active material precursor.

The average particle size of the resulting positive electrode active material precursor formed of a plurality of nickel composite hydroxide particles, was 12.5 μm, when measured using a laser diffraction scattering particle size analyzer (Microtrack HRA, manufactured by Nikkiso Co., Ltd.).

Further, the resulting plurality of nickel composite hydroxide particles were embedded in resin, and were subjected to cross sectional polisher processing so that cross sectional observation of the particles became possible, and were observed by SEM (Scanning Electron Microscope S-4700 manufactured by Hitachi High-Technologies, Ltd.).

From the particles of the obtained cross-sectional SEM images, one particle was selected, in which the average value of the long side and the short side of the cross section was within ±1 μm of the average particle size of the positive electrode active material precursor described above.

Then, on the cross section of the selected particle, a binarization process was performed using image analysis software (ImageJ, software developed by the National Institutes of Health, U.S.A.), and then the ratio of the area of the voids to the cross section of the selected particle was calculated to be 0.4%. Note that in the binarization process, a threshold was determined by a discrimination analysis method.

Further, on the cross section on which the binarization process was performed, a circular region having a radius of 1.78 μm was set at a position where the ratio of the area of the voids to the circular region was maximum, and the ratio of the area of the voids to the circular region was calculated to be 1.5%.

The results are given in Table 1.

The resulting positive electrode active material precursor was roasted for 6 hours at 700° C. in an air flow (oxygen: 21 volume %), and the entire positive electrode active material precursor was turned into a nickel composite oxide (roasting process), and was then subjected to the process of manufacturing a positive electrode active material.

(Manufacture of Positive Electrode Active Material)

By the following procedure, a mixture of a lithium compound and a composite metal oxide obtained after the roasting process described above, was prepared (mixing process).

As the lithium compound, a lithium hydroxide monohydrate ($LiOH \cdot H_2O$) was subjected to anhydrous treatment by vacuum drying, and the resulting anhydrous lithium hydroxide was used.

In the mixing process, the lithium compound and the composite metal oxide were weighed and mixed to form a mixture so that the ratio of the number of atoms of Li/Me in the mixture was 1.035. Here, Me refers to the total number of atoms of metals other than Li, and is the sum of Ni and Co.

The mixture obtained by the mixing process was loaded into a firing vessel having an internal dimension of 280 mm (L)×280 mm (W)×90 mm (H), and the mixture was fired by using a roller-hearth kiln, which is a continuous firing furnace, in which the maximum temperature (firing temperature) was set at 770° C. in an atmosphere having an oxygen concentration of 80 volume % with the remainder being inert gas (firing process). Further, the resulting fired product was charged into pure water to obtain a mass ratio of 1.5 with respect to water 1 and a slurry was prepared. Then, after stirring for 30 minutes, filtration and drying were carried out to obtain a positive electrode active material (water-washing process).

(Manufacture of Non-Aqueous Electrolyte Secondary Battery)

The resulting lithium-nickel composite oxide was used as a positive electrode active material to fabricate and evaluate a 2032-type coin-type battery.

Figure 2:
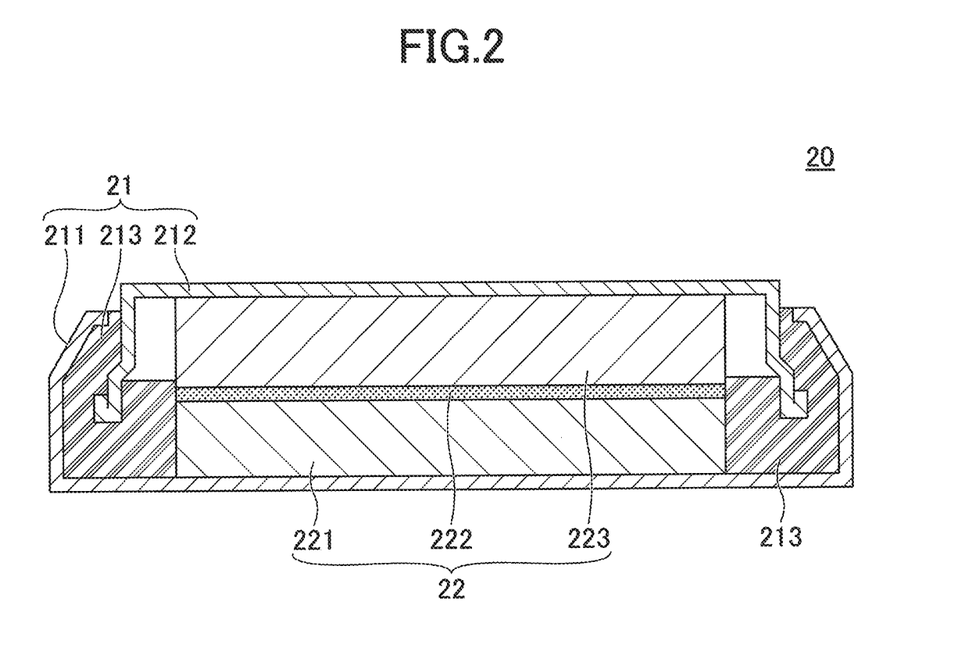
FIG. 2 is a diagram illustrating a cross-sectional configuration of a coin-type battery fabricated in examples and comparative examples.

The configuration of the fabricated coin-type battery will be described with reference to FIG. 2. FIG. 2 schematically illustrates a cross-sectional diagram of a coin-type battery.

As illustrated in FIG. 2, a coin-type battery 20 includes a case 21 and an electrode 22 accommodated within the case 21.

The case 21 includes a positive electrode can 211 that is hollow and that has one end opened, and a negative electrode can 212 disposed at the opening of the positive electrode can 211. When the negative electrode can 212 is disposed at the opening of the positive electrode can 211, a space for accommodating an electrode 22 is formed between the negative electrode can 212 and the positive electrode can 211.

The electrodes 22 includes a positive electrode 221, a separator 222, and a negative electrode 223, which are stacked in this order. The positive electrode 221, which contacts the inner surface of the positive electrode can 211, and the negative electrode 223, which contacts the inner surface of the negative electrode can 212, are accommodated in the case 21.

Note that the case 21 includes a gasket 213, which fixes the positive electrode can 211 and the negative electrode can 212, so as to maintain an electrically insulating state between the positive electrode can 211 and the negative electrode can 212. The gasket 213 also has a function of sealing the gap between the positive electrode can 211 and the negative electrode can 212 so as to block the inside of the case 21 from the outside in an air-tight and liquid-tight manner.

This coin-type battery 20 was fabricated as follows. First, 52.5 mg of the resulting lithium-nickel composite oxide particles, 15 mg of acetylene black, and 7.5 mg of polytetrafluoroethylene (PTFE) resin were mixed with N-methyl-2-pyrrolidone which is a solvent, and were press molded at a pressure of 100 MPa to a diameter of 11 mm and a thickness of 100 μm, to fabricate the positive electrode 221. The fabricated positive electrode 221 was dried in a vacuum dryer for 12 hours at 120° C. The positive electrode 221, the negative electrode 223, the separator 222, and the electrolyte solution were used to fabricate the coin-type battery 20 in a glove box in an Ar atmosphere with the dew point controlled to −80° C.

Note as the negative electrode 223, a negative electrode sheet cut into a disk with a diameter of 14 mm was used. The negative electrode sheet was fabricated by applying, to copper foil, a negative electrode mixture paste, in which graphite powder having an average particle size of approximately 20 μm and polyvinylidene fluoride were mixed with N-methyl-2-pyrrolidone which is a solvent, and then drying the negative electrode mixture paste. Further, as the separator 222, a polyethylene porous membrane having a thickness of 25 μm was used. As the electrolyte solution, a mixture solution (manufactured by TOMIYAMA PURE CHEMICAL INDUSTRIES, LTD.) of equal amount of ethylene carbonate (EC) and diethyl carbonate (DEC) using 1 M of $LiClO_4$ as the supporting electrolyte, was used.

(Battery Evaluation)

In the battery evaluation, the cycle characteristic was evaluated. The cycle characteristic was evaluated by measuring the capacity maintenance rate after 200 cycles of charging and discharging. Specifically, each cycle for conditioning included charging the manufactured coin-type battery up to a cut-off voltage of 4.9 V with a current density of 0.3 mA/cm$^2$ in a constant-temperature tank held at 25° C., and after a 1-hour pause, discharging the battery to a cut-off voltage of 3.5 V. This cycle was repeated 5 times to perform conditioning. Then, as subsequent cycles, each cycle included charging the manufactured coin-type battery up to a cut-off voltage of 4.9 V with a current density of 2.0 mA/cm$^2$ in a constant-temperature tank held at 60° C., and after a 1-hour pause, discharging the battery to a cut-off voltage of 3.5 V. This cycle was repeated 200 times, and the discharging capacity of each cycle was measured to perform the evaluation.

The capacity maintenance rate of the coin-type battery is the ratio obtained by dividing the discharging capacity, which is obtained at the 200th cycle after repeating the 200 cycles after the conditioning cycles, by the discharging capacity obtained at the first cycle after the conditioning cycles. When the capacity maintenance rate of the coin-type battery is greater than or equal to 90%, it can be said that the battery has a sufficiently high cycle characteristic.

As a result of the evaluation, the coin-type batter of example 1 had a capacity maintenance rate of 97.8%, which is the ratio obtained by dividing the discharging capacity obtained at the 200th cycle of the 200 cycles after the conditioning cycles, by the discharging capacity obtained at the first cycle of the 200 cycles after the conditioning cycles.

Evaluation results are given in Table 1.

Examples 2, 3

In the crystallization process, the positive electrode active material precursor, the positive electrode active material, and the battery were fabricated and evaluated in the same manner as example 1, except that as the ammonium ion concentration and the pH of the initial aqueous solution and the reaction solution, as well as the oxygen concentration in the atmosphere of the reaction tank, the values indicated in Table 1 were used. The results are given in Table 1.

Example 4

In manufacturing the positive electrode active material precursor, in the crystallization process, $Ni_{0.91}Co_{0.09}(OH)_2$ was manufactured as the positive electrode active material precursor. Therefore, as the mixed aqueous solution (a) including nickel salt and cobalt salt, each metal salt was added and mixed so that the amount of substance ratio of nickel and cobalt was Ni:Co=91:9 and the concentration of the metal salt was 2.1 mol/L. As the nickel salt and cobalt salt, the same salts as example 1 were used.

In the crystallization process, the ammonium ion concentration and the pH of the initial aqueous solution and the reaction solution, as well as the oxygen concentration in the atmosphere of the reaction tank, were set as the values indicated in Table 1.

Other than the above points, the positive electrode active material precursor, the positive electrode active material, and the non-aqueous electrolyte secondary battery were fabricated and evaluated in the same manner as in example 1.

Example 5

In manufacturing the positive electrode active material precursor, in the crystallization process, $Ni_{0.88}Co_{0.085}Al_{0.035}(OH)_2$ was manufactured as the positive electrode active material precursor. Therefore, as the mixed aqueous solution (a) including nickel salt, cobalt salt, and aluminum salt, each metal salt was added and mixed so that the amount of substance ratio of nickel, cobalt, and aluminum was Ni:Co:Al=88:8.5:3.5 and the concentration of the metal salt was 2.1 mol/L. As the nickel salt and cobalt salt, the same salts as example 1 were used, and as the aluminum salt, sodium aluminate was used.

In the crystallization process, the ammonium ion concentration and the pH of the initial aqueous solution and the reaction solution, as well as the oxygen concentration in the atmosphere of the reaction tank, were set as the values indicated in Table 1.

Other than the above points, the positive electrode active material precursor, the positive electrode active material, and the non-aqueous electrolyte secondary battery were fabricated and evaluated in the same manner as in example 1.

Example 6

In manufacturing the positive electrode active material precursor, in the crystallization process, $Ni_{0.91}Co_{0.045}Al_{0.045}(OH)_2$ was manufactured as the positive electrode active material precursor. Therefore, as the mixed aqueous solution (a) including nickel salt, cobalt salt, and aluminum salt, each metal salt was added and mixed so that the amount of substance ratio of nickel, cobalt, and aluminum was Ni:Co:Al=91:4.5:4.5 and the concentration of the metal salt was 2.1 mol/L. As the nickel salt and cobalt salt, the same salts as example 1 were used, and as the aluminum salt, sodium aluminate was used.

In the crystallization process, the ammonium ion concentration and the pH of the initial aqueous solution and the reaction solution, as well as the oxygen concentration in the atmosphere of the reaction tank, were set as the values indicated in Table 1.

Other than the above points, the positive electrode active material precursor, the positive electrode active material, and the non-aqueous electrolyte secondary battery were fabricated and evaluated in the same manner as in example 1.

Comparative Examples 1 to 4

In the crystallization process, the ammonium ion concentration and the pH of the initial aqueous solution and the reaction solution, as well as the oxygen concentration in the atmosphere of the reaction tank, were set as the values indicated in Table 1. Otherwise, the positive electrode active material precursor, the positive electrode active material, and a battery were fabricated and evaluated in the same manner as in example 1. The results are given in Table 1.

Comparative Example 5

In the crystallization process, the ammonium ion concentration and the pH of the initial aqueous solution and the reaction solution, as well as the oxygen concentration in the atmosphere of the reaction tank, were set as the values indicated in Table 1. Otherwise, the positive electrode active material precursor, the positive electrode active material, and a battery were fabricated and evaluated in the same manner as in example 4. The results are given in Table 1.

Comparative Example 6

In the crystallization process, the ammonium ion concentration and the pH of the initial aqueous solution and the reaction solution, as well as the oxygen concentration in the atmosphere of the reaction tank, were set as the values indicated in Table 1. Otherwise, the positive electrode active material precursor, the positive electrode active material, and a battery were fabricated and evaluated in the same manner as in example 5. The results are given in Table 1.

Comparative Example 7

In the crystallization process, the ammonium ion concentration and the pH of the initial aqueous solution and the reaction solution, as well as the oxygen concentration in the atmosphere of the reaction tank, were set as the values indicated in Table 1. Otherwise, the positive electrode active material precursor, the positive electrode active material, and a battery were fabricated and evaluated in the same manner as in example 6. The results are given in Table 1.

TABLE 1

| | CONDITION OF CRYSTALLIZATION PROCESS | | | EVALUATION RESULT OF POSITIVE ELECTRODE ACTIVE MATERIAL PRECURSOR | | EVALUATION OF BATTERY |
|---|---|---|---|---|---|---|
| | OXYGEN CONCENTRATION (VOLUME %) | AMMONIUM ION CONCENTRATION (g/L) | pH | AREA RATIO OF VOIDS (%) | | CAPACITY RETENTION RATE (%) |
| | | | | PARTICLE CROSS SECTION | CIRCULAR REGION | |
| EXAMPLE 1 | 5.0 | 17.0 | 11.5 | 0.4 | 1.5 | 97.8 |
| EXAMPLE 2 | 13.0 | 16.0 | 11.3 | 3.4 | 9.0 | 94.4 |
| EXAMPLE 3 | 15.0 | 15.5 | 11.8 | 4.0 | 18.0 | 94.0 |
| EXAMPLE 4 | 5.0 | 16.0 | 11.3 | 4.8 | 16.0 | 98.4 |
| EXAMPLE 5 | 5.0 | 15.8 | 12.0 | 2.4 | 8.0 | 96.9 |
| EXAMPLE 6 | 5.0 | 17.5 | 12.3 | 0.6 | 2.1 | 98.2 |
| COMPARATIVE EXAMPLE 1 | 15.0 | 3.0 | 11.4 | 7.0 | 21.0 | 88.1 |
| COMPARATIVE EXAMPLE 2 | 23.0 | 16.0 | 11.5 | 8.0 | 23.0 | 78.9 |
| COMPARATIVE EXAMPLE 3 | 13.0 | 17.0 | 10.5 | 9.1 | 21.7 | 80.5 |
| COMPARATIVE EXAMPLE 4 | 20.0 | 13.0 | 10.2 | 6.0 | 21.0 | 87.0 |
| COMPARATIVE EXAMPLE 5 | 25.0 | 15.0 | 11.0 | 7.2 | 22.4 | 89.8 |
| COMPARATIVE EXAMPLE 6 | 25.0 | 13.5 | 10.5 | 7.2 | 22.3 | 86.5 |
| COMPARATIVE EXAMPLE 7 | 20.0 | 12.6 | 10.2 | 5.8 | 19.0 | 88.8 |

According to the results indicated in Table 1, in examples 1 to 6, it was confirmed that it was possible to obtain a positive electrode active material precursor including nickel composite hydroxide particles in which the ratio of the area of the voids to the cross section was less than or equal to 5.0%, and when a predetermined circular region is set to the cross section, the ratio of the area of the voids to the circular region was less than or equal to 20%. Further, in a battery using a positive electrode active material fabricated from the positive electrode active material precursor, the capacity maintenance rate was greater than or equal to 90%, so that it was confirmed that an excellent cycle characteristic was demonstrated.

In contrast, in comparative examples 1 to 7, it was confirmed that in the obtained positive electrode active material precursor including the nickel composite hydroxide particles, the ratio of the area of the voids to the cross section exceeded 5.0%, and in comparative examples 1 to 6, when a predetermined circular region was set in the cross section, it was confirmed that the ratio of the area of the voids to the circular region exceeded 20%. Further, in the battery using the positive electrode active material fabricated from the positive electrode active material precursor, the capacity maintenance rate was less than 90%, and it was confirmed that the cycle characteristics were inferior to those of examples 1 to 6.

Although the positive electrode active material precursor for the non-aqueous electrolyte secondary battery and the method of manufacturing the positive electrode active material precursor for the non-aqueous electrolyte secondary battery have been described with reference to the embodiments and examples, the present invention is not limited to the above-described embodiments and examples. Various modifications and variations are possible within the scope of the present invention as defined in the claims.

The present application claims the priority of the patent application No. 2017-228250 filed with the Japan Patent Office on Nov. 28, 2017, and the entire contents of the patent application No. 2017-228250 are incorporated herein by reference.

The invention claimed is:

1. A positive electrode active material precursor for a non-aqueous electrolyte secondary battery, the positive electrode active material precursor comprising:
nickel composite hydroxide particles, wherein
a cross section of each nickel composite hydroxide particle includes voids,
greater than or equal to 50% to less than or equal to 100% of the nickel composite hydroxide particles have
a ratio of an area of the voids to the cross section of the nickel composite hydroxide particle is less than or equal to 5.0%; and
a circular region having a radius of 1.78 μm is set at a position where a ratio of an area of the voids to the circular region is maximum, on the cross section of the nickel composite hydroxide particle, and
the ratio of the area of the voids to the circular region is less than or equal to 20%.

2. A method of manufacturing the positive electrode active material precursor for a non-aqueous electrolyte secondary battery of claim 1, the method comprising:
crystallizing the positive electrode active material precursor including a nickel composite hydroxide particle under an atmosphere having an oxygen concentration of from 5.0 volume % to 15 volume %, in a reaction solution consisting of
metal salts including at least a nickel salt,
an ammonium ion supplier, and
an alkaline metal hydroxide, wherein
an ammonium ion concentration of the reaction solution is greater than or equal to 13.0 g/L and less than or equal to 18.0 g/L, and
a pH value of the reaction solution is greater than or equal to 11.0 and less than or equal to 13.0 based on a liquid temperature of 50° C.

3. The method according to claim 2, wherein the pH value of the reaction solution is from 11.3 to 12.3 based on a liquid temperature of 50° C.

4. The method according to claim 2, wherein the crystallization process is a continuous crystallization process in which
a pH of the reaction solution is maintained at a predetermined pH; and
the reaction solution is continuously overflowed from a reaction vessel to collect the positive electrode active material precursor.

* * * * *